United States Patent [19]

Bayer

[11] Patent Number: 5,137,164
[45] Date of Patent: * Aug. 11, 1992

[54] CLOSURE ASSEMBLY USING EPOXIDIZED NATURAL OIL IN A LOW FUSING PLASTISOL

[75] Inventor: John W. Bayer, Toledo, Ohio

[73] Assignee: Owens-Illinois Closure Inc., Toledo, Ohio

[*] Notice: The portion of the term of this patent subsequent to Aug. 21, 2007 has been disclaimed.

[21] Appl. No.: 655,473

[22] Filed: Feb. 14, 1991

Related U.S. Application Data

[60] Division of Ser. No. 614,068, Nov. 9, 1990, which is a continuation of Ser. No. 330,571, Mar. 30, 1989, abandoned, which is a continuation-in-part of Ser. No. 204,847, Jun. 10, 1988, Pat. No. 4,949,859, which is a continuation-in-part of Ser. No. 21,936, Mar. 5, 1987, abandoned.

[51] Int. Cl.$^5$ ............................................. B65D 53/00
[52] U.S. Cl. ..................................... 215/352; 215/341; 264/268; 264/45.3; 264/46.6
[58] Field of Search .................... 215/341, 348, 352; 264/268, 45.3, 46.4, 46.6

[56] References Cited

U.S. PATENT DOCUMENTS

| | | | |
|---|---|---|---|
| 2,427,699 | 9/1947 | Aronovsky | 264/46.6 X |
| 3,002,641 | 10/1961 | Normandy | 264/45.3 X |
| 3,231,527 | 1/1966 | Kuhn et al. | 215/341 X |
| 3,283,936 | 11/1966 | Kehe et al. | 215/341 |
| 3,442,411 | 5/1969 | Mahoney | 264/46.4 X |
| 3,563,402 | 2/1971 | Arnold | 215/341 |
| 3,574,147 | 4/1971 | Giessler et al. | 215/348 X |
| 3,612,326 | 10/1971 | Marks | 215/341 X |
| 3,613,613 | 10/1971 | Loritz | 215/341 X |
| 3,627,707 | 12/1971 | Giessler et al. | 215/341 X |
| 3,687,362 | 9/1971 | Cormack, Jr. | 215/341 |
| 3,695,477 | 10/1972 | Edmonston et al. | 215/341 |
| 4,097,558 | 6/1978 | Kuhn | 260/899 |
| 4,130,213 | 12/1978 | Wszolek | 215/349 |
| 4,244,481 | 1/1981 | Kornelis | 215/348 |
| 4,274,822 | 6/1981 | Tamai et al. | 264/46.6 X |
| 4,278,718 | 7/1981 | Billings et al. | 428/64 |
| 4,392,581 | 7/1983 | Itsubo et al. | 215/348 |
| 4,527,705 | 7/1985 | Prades | 215/252 |
| 4,700,860 | 10/1987 | Li | 215/256 |
| 4,949,859 | 8/1990 | Bayer | 215/341 |

Primary Examiner—Stephen Marcus
Assistant Examiner—Stephen Cronin

[57] ABSTRACT

The present invention provides a method of lining a plastic closure top with a thermoplastic, non-cross linked curable, vinyl chloride copolymer plastisol composition that is plasticized with an effective low temperature fusing amount of (A) an epoxydized natural oil, (B) an organic diglycidyl ether and (C) a curing agent for the diglycidyl ether, the plastisol being stable with a shelf life of at least about four months, the method including heating, without preheating, the lining and the closure top at a temperature not over about 300° F. for about 90 to 120 seconds using convection heating without pressure and without conductive heating, to fuse the composition and thereafter solidifying the fused compositon and thereafter cure the composition to provide the lining with tensile and elongation measurements sufficient for a stable closure assembly.

16 Claims, No Drawings

CLOSURE ASSEMBLY USING EPOXIDIZED NATURAL OIL IN A LOW FUSING PLASTISOL

This application is a division of application Ser. No. 614,068, filed Nov. 9, 1990, which application is a file wrapper continuation of Ser. No. 330,571 filed Mar. 30, 1989 abandoned, which is a continuation-in-part application of application Ser. No. 204,847 filed Jun. 10, 1988 now U.S. Pat. No. 4,949,859, which application in turn is a continuation-in-part of application Ser. No. 021,936 field Mar. 5, 1987 abandoned.

The present invention relates to a closure assembly and a method of making the assembly in which an epoxidized natural oil plasticizer is used in a vinyl chloride copolymer plastisol (solid) lining for the inside of a closure top.

BACKGROUND OF THE INVENTION

U.S. Pat. No. 4,304,744 (assigned to W. R. Grace) is directed to a closure assembly using a polypropylene closure cap. The patent discloses a method of lining the polypropylene closure with a polyvinyl chloride plastisol compound that is fused by microwave techniques. The patent discloses the use of phthalate plasticizers such as diisooctyl phthalate (Example 1) or butyl benzyl phthalate (col. 10, line 47). The main thrust of the patent is the microwave fusing of the lining which requires a preheating step for a good fused lining. The preheat temperature must be at least about 103° C. up to about 160° C. The closure assembly is made without damage to the polypropylene closure.

In U.S. Pat. No. 3,462,331 to Simons, a liner is prepared for a metal cap. A plastisol is applied to the metal cap with conductive heating and pressure. The plastisol cannot be applied to a plastic cap in the same fashion, the conductively heated plunger being releasable by the inner coating of the metal cap. With a plastic cap the liner would stick to the plunger and be released with it. The Simons patent has no suggestion of the curable vinyl chloride epoxidized oil plastisol.

It is desirable to have a curable plastisol composition that can be easily used for a lining and effectively fused, without preheating, at a temperature below 130° C., say about 290° F. up to about 300° F., and without the need for microwave energy and without conduction heating and pressure. It is desired that the composition can be quickly and easily cured at a low temperature, say, room temperature. The curable plastisol composition should also be stable with a shelf life of at least about four to six months.

OBJECTS OF THE INVENTION

It is an object of the present invention to provide a low fusing curable vinyl chloride copolymer solid or foam plastisol lining that can be easily applied to the inside top of a plastic closure in a closure assembly, the lining being efficiently and economically fused at 300° F. or below without preheating or the use of microwave energy, and without conduction heating with pressure.

It is an object of the present invention to provide a low temperature fusing, curable vinyl chloride copolymer plastisol that is stable with a long shelf life, at least about four to six months or more, the plastisol being plasticized with an epoxidized natural oil that can be easily applied as a lining to a closure top and efficiently fused, without preheating, at a temperature of about 300° F. or below, and therefore cured at room temperature.

It is an object of the present invention to provide a method of lining a plastic closure in which the closure has a top and a skirt for engagement with a neck of a closure, the lining being around the periphery of the inside of the closure top for sealing the resultant closure assembly; the method including the steps of: (A) providing a vinyl chloride copolymer plastisol composition including small and large particles of the copolymer having a least about 80 weight percent vinyl chloride and about 20 weight percent or less of another copolymerizable monomer, optionally a blowing agent, and a low fusing temperature plasticizer that is an epoxidized natural vegetable oil on the top of the closure as an unfused lining, an organic epoxide plasticizer, and a curing agent for the epoxide and (B) heating the lining and closure at a temperature of not over about 300° F. for about 90 to 120 seconds to fuse the plastisol composition and thereafter solidify to provide a lining with tensile and elongation measurements for a stable closure assembly, the plastisol curing at a temperature as low as room temperature.

These and other objects will be apparent from the specification that follows, and in the appended claims.

SUMMARY OF THE INVENTION

The present invention provides a method of lining a plastic closure top with a thermoplastic, non-cross linked curable, vinyl chloride copolymer plastisol composition that is plasticized with an effective low temperature fusing amount of (A) an epoxidized natural oil, (B) an organic diglycidyl ether and (C) a curing agent for the diglycidyl ether, the plastisol being stable with a shelf life of at least about four months, the method including heating, without preheating, the lining and the closure top at a temperature not over about 300° F. for about 90 to 120 seconds using convection heating without pressure and without conductive heating, to fuse the composition and thereafter solidifying the fused composition and thereafter cure the composition to provide the lining with tensile and elongation measurements sufficient for a stable closure assembly. A blowing agent can be provided in the plastisol composition to provide a low fusing cured foam plastisol with improved resiliency, lower density and lower cost than a solid (non-foam) plastisol. In some cases, better seals are obtained with the foam linings with generally lower torques being required to form the seal in closure assembly.

The present invention also provides a closure assembly comprising a closure having a top having an inside surface and a depending skirt adapted for engagement with a container finish, a plastisol composition annular ring gasket around the periphery of the inside surface of the top to form a seal with the closure and the container finish, the plastisol composition comprising thermoplastic vinyl chloride copolymer particles, an epoxidized vegetable oil plasticizer effective to fuse the particles in the composition at 300° C. or below to provide a stable gasket by convection heating, the composition also preferably containing an organic diglycidyl ether and an amine curing agent therefrom, whereby the composition is easily cured at a low temperature including room temperature.

The organic diglycidyl either is preferably an epoxy resin such as EPON 828 SM (Shell) that is bisphenol A-diglycidyl ether. Preferred epoxy resins are low molecular weight reaction products of bisphenol A and epichlorohydrin. For some applications, a reaction product of O-cresol or phenol and formaldehyde with epichlorohydrin, can be used.

The curing agent for the diglycidyl ether is preferably an amine such as an amide-amine resin (Buehler hardener) Versamid TM or di- and triamines such as diethylentriamine and triethylentetraamine.

The epoxy resin is preferably used in amounts of about 1 to 15 weight parts per 20 parts vinyl chloride copolymer, the curing agent preferably being used in amount of 0.5 to 2 gm per 5 gms of epoxy or 20 gms of the copolymer.

DETAILED DESCRIPTION OF THE INVENTION

The stable vinyl chloride copolymer plastisol composition comprises generally large and small particles of a vinyl chloride copolymer with about 80 to 95 weight percent vinyl chloride and about 5 to 20 weight percent of another copolymerizable vinyl monomer that is vinyl acetate or ethylene acrylate or maleic anhydride or styrene or a mixture thereof. In the copolymer, vinyl chloride should be at least about 80 weight percent and preferably about 85 to 95 weight percent. Other conventional plastisol ingredients, as set forth in the W. R. Grace U.S. Pat. No. 4,304,744, can be used such as pigments, fillers, heat stabilizers, slip agents, and lubricants.

The epoxidized natural oil plasticizer is preferably epoxidized soybean oil. Other suitable epoxidized natural vegetable oils are epoxidized linseed oil, epoxidized tall oil and epoxidized flaxseed oil. Effective low temperature fusing amounts of the epoxidized oil plasticizer are generally about 30 to 130 parts by weight and preferably about 70 to 100 parts by weight per 100 parts by weight of the vinyl chloride copolymer such as a vinyl chloride/vinyl acetate copolymer or a vinyl chloride/ethylene acrylate copolymer with 85 to 95 weight percent vinyl chloride.

Examples 1, 2 and 3 illustrate low fusing composition made with the vinylchloride copolymer and epoxidized oil. They are thermoplastic. Example 4 is cross-linked, being curable at room temperature.

EXAMPLE 1

A stable, low temperature fusing plastisol composition was prepared using the following formulation:

| Ingredients | Parts by Wt. |
| --- | --- |
| Copolymer of 85 parts by weight of vinyl chloride and 15 parts by weight of vinyl acetate (small particles) | 60 |
| Copolymer of 85 parts by weight of vinyl chloride and 15 parts by weight of vinyl acetate (large particles) | 40 |
| Thermal Stabilizer (Interstab CZ11D TM) | 1.5 |
| Pigment, TiO$_2$ | 1.0 |
| Slip Agent, polydimethylsiloxane oil, (Dow Corning DC-200 TM silicone oil) | 2.0 |
| Oleamide, lubricant | 3.0 |
| Epoxidized soybean oil | 80 |

The above plastisol composition was applied to a plastic closure top as a (solid) lining and the composition fused at 299° F. for 90 seconds to provide tensile and elongation measurements for an outstanding, stable, closure assembly.

The plastisol lining was very successful based on efficient processing conditions (such as a shelf life of 12 months and a low fusing temperature, without preheating, low cost and freedom from toxicity.

When a blowing agent at 0.4 parts by weight per 100 parts of copolymer is used in the formulation of Example 1, the copolymer composition is blown and fused at 300° F. or below to provide a foam lining having the above desirable properties and having a lower cost, lighter weight and a better seal in some cases, the sealing generally requiring less torque.

The closure preparation and lining, the compounding of the plastisol composition are conventional except that the foam composition has an outstanding balance of properties including a long shelf life of at least 4 months and preferably 8 to 12 months or more, and the low fusing temperature, without the need for a preheating step.

The storage stability of the solid and the foam plastisol of Example 1 was very good as indicated by the following viscosity data:

Storage Stability

EXAMPLE 1 Plastisol

| Time | Viscosity (Burell-Severs Rheometer Model A-120) |
| --- | --- |
| One day | 2842 cps at 100° F. |
| One week | 2807 cps at 100° F. |
| Four months | 3394 cps at 100° F. |
| Six months | 3467 cps at 100° F. |
| Butyl benzyl phthalate plastisol | |
| One day | 1048 cps at 100° F. |
| One week | gelled |

The closure preparation and method of lining the closure top is set forth, along with test results on the closure assembly, employing the plastisol set forth in the Example 1 as follows:

EXAMPLE 2

Closure Preparation, Lining and Closure Assembly Using Conventional, Standard Equipment 38 mm Snap-Caps, molded from propylene copolymer resin, 83 mm Flex-Band, propylene homopolymer resin, and 63 mm Quik metal lug closures were lined as follows:

The plastisol of Example 1 (solid or foam) is heated to 100° F. and nozzle lined into the closures to attain about 0.030" thick film in an annular ring. The closures were then placed in the laboratory Radco electric oven set at 300° F. (288° F. actual temperature as measured by thermocouple) and 25% belt speed. Thermocouple measurements show the 288° F. is maintained for 90 seconds. The closures are forced cooled, and allowed a minimum of one week age before packing to allow the lubricant to bloom to the surface.

Closure Pack Results

The closures were tested by filling their respective jars with 190° F. water and applying the closure. Following are the pack results to date.

| CLOSURE | VACUUM (in Hg) 1 wk. | 1 mo. | REMOVAL TORQUE one month |
|---|---|---|---|
| 38 mm Snap Cap | 18.4 | 19.5 | — |
| 83 mm Flex-Band | — | 13.2 | 45 |
| 63 mm Quik | — | 21.0 | 39 |

The test results indicate the commercial utility of the invention since many variations can be made to the plastisol formula, the fusing process, the closure shell design and material, and packing conditions using the epoxidized oil plasticizer.

As noted above, the present invention can be used with plastic closures, preferably polypropylene caps, propylene/ethylene copolymer caps or even polyethylene caps.

As previously indicated, the vinyl chloride copolymer/epoxidized oil plastisol can be made as a foam lining with advantages of resiliency, lower cost and lower density.

A blowing agent that releases gas for foaming at a low temperature of below about 290° F. to 300° F. can be used such as the preferred blowing agent [p,p$^1$-oxybis (benzene sulfonyl hydrazide)] (OBSH) preferably activiated by an alkanol amine that is preferably triethanol amine (TEA). Such a blowing agent helps to provide a low fusing temperature of about 300° F. at a very short time of about 90 seconds.

The following example illustrates the vinyl chloride copolymer/epoxidized oil foam plastisol composition.

EXAMPLE 3

A foam plastisol lining was made along the lines described in Example 1 for the solid plastisol lining, the foam plastisol composition being as follows:

| Ingredients | Parts by Weight |
|---|---|
| 85/15 copolymer of vinyl chloride and vinyl acetate (large particles) | 60 parts per hundred resin |
| 85/15 copolymer of vinyl chloride and vinyl acetate (small particles) | 40 parts per hundred resin |
| Stabilizer | 1.5 parts per hundred resin |
| TiO$_2$ | 1.0 parts per hundred resin |
| Silicone Oil | 2.0 parts per hundred resin |
| Oleamide (lubricant) | 3.0 parts per hundred resin |
| p,p$^1$-oxybis (benzene sulfonyl hydrazide) | 0.4 parts per hundred resin |
| Triethanol amine activator | 1.5 parts per hundred resin |
| Epoxidized soybean oil | 100 parts per hundred resin |

The above was doctored onto a steel plate and cured for 90 seconds at an oven setting of 300° F. Thermocouple measurements show this to yield a peak temperature of 288° F. Density of the formulation proved to be 1.0365 gm/cc. A similar formulation without either the blowing agent or activator yields density of 1.23–1.24 g/cc.

Further work indicates limits on the concentrations of OBSH [p,p$^1$-oxybis (benzene sulfonyl) hydrazide]. The maximum amount preferred of OBSH is about 0.4 phr. Higher amounts tend to sometimes lead to severe blistering which destroys the integrity of resulting sealing characteristics. The TEA concentration preferably should be between about 0.5 phr and 2.0 phr. Lower amounts are ineffective, higher amounts cause odor problems.

Plastisol without foaming agent (HL-4072) and with foaming agent (HL4103) were lined into 82 mm closures, packed on 55° F. water containing blue dye and stored on their sides for one week. Following are the number of leaking packages per 10 tested:

|  | HL4072 (Ex. 1) | HL4073 (Ex. 3) |
|---|---|---|
| 20 in # application | 4 | 0 |
| 30 in # application | 1 | 0 |
| 40 in # application | 0 | 0 |

As can be seen, leakage is reduced at lower application torque.

In the above formulations other ingredients can be adjusted to improve and to optimize the formulations in regard to other properties such as viscosity, physical strength, hardness, etc.

The outstanding foam plastisol liners of the present invention generally have a density of about 0.98 gm/cc up to about 1.09 gm/cc and preferably about 1.00 g/cc to 1.06 g/cc. The preferred range of blowing agent is about 0.1 or 0.2 up to 0.4 phr.

The Cormack, Jr. U.S. Pat. No. 3,607,362 discloses a solid lining composition that is a carbonyl containing vinyl chloride polymer and an epoxidized unsaturated fatty oil. The epoxidized oil reacts with the carbonyl group of the polymer. In the table in column 4, the reacted crosslinked polymer compositions B and C have relatively high fusing points of at least about 400° F. Homopolymer composition A has a high fusing temperature of at least about 375° F. to 400° F. in a time of 90 to 120 seconds, which is much higher than the 280° F. to 300° F. fusing temperature of the present invention.

In plotting ultimate stress (psi) versus fusing temperature, a desired minimum ultimate stress of about 750 psi is obtained at 280° to 300° F. by the vinyl chloride copolymer/epoxidized oil composition of the present invention as compared to only about 275 psi for a similar homopolymer of vinyl chloride/epoxidized oil plastisol composition.

EXAMPLE 4

This example shows the replacement of part of the epoxidized soybean oil plasticizer in the vinyl chloride copolymer by epoxy resins that are cross-linked to thereby improve the liner properties such as heat resistance.

The following example formulations show the idea and the improvements to thermal properties resulting from the cross-linking reaction:

| Plastisol | A | B |
|---|---|---|
| 85/15 Vinyl chloride/ vinyl acetate copolymer | 20 gm | 20 gm |
| Epoxidized soybean oil (plasticizer) | 15 gm | 20 gm |
| Bisphenol A - diglycidyl ether EPON 828 TM Shell | 5 gm | — |
| Beuhler hardener (amide-amine resin) | 1 gm | 1 gm |

The two plastisol formulations were compounded by common techniques. The resulting plastisols were then poured into molds and fused and solidified for 10 minutes at 300° F. These were cooled at room temperature overnight to cure the same. The castings were then placed in a controlled lab oven and the Shore A hardness measured at various temperatures. Following are the results:

| Temperature | A | B |
| --- | --- | --- |
| 70° F. | 75 | 40 |
| 110° F. | 65 | 44 |
| 158° F. | 54 | 34 |
| 209° F. | 42 | 26 |
| 259° F. | 32 | 17 |

It can be seen that a marked improvement in hardness occurs at all temperatures with the plastisol with part of the plasticizer substituted by the diepoxide (Sample A).

EXAMPLE 5

The following plastisol was prepared:

| Ingredients | Parts by Weight |
| --- | --- |
| 90/10 Vinyl chloride vinyl acetate copolymer | 20 |
| Epoxidized soybean oil | 15 |
| Bisphenol A - diglycidyl ether | 5 |
| Triethylene tetramine curing agent | 1 |

A plastic cap (polypropylene) was lined with the formulation and the lined cap placed in an oven where it was heated by convection heat without pressure for about 100 seconds at 300° F. to fuse the plastisol. Thereafter the lined cap was removed to solidify the liner. The liner cured in about eight hours at room temperature to provide a crosslinked liner that is heat stable and heat resistant.

One of the preferred liquid epoxy resins, EPON TM REsin 828 is described in a Technical Bulletin SC:235-85.828 (October 1985) Shell Chemical Company which is incorporated herein. As therein stated typical properties of the epoxy resin are as follows:

| Epoxide, eq/100 g | 0.52–0.54 |
| --- | --- |
| Epoxide equivalent wt. | 185–192 |
| Viscosity, Poise @ 25° C. (77° F.) | 110–150 |
| Specific gravity, 20° C. (68° F.) | 1.16 |

Curing agents are described including aliphatic amines, polyamides, aromatic amines and anhydrides. Liquid diethylenetriamine and liquid triethylenetetramine are reported to typically cure at 25° C. (77° F.).

What is claimed is:

1. A closure assembly comprising a closure cap with a top and a depending skirt for engagement with a neck portion of a container, the closure having an inside and outside periphery, a non-foam thermoplastic plastisol composition liner around the edge of the periphery of the cap top on the inside between the cap and the container, the plastisol composition having a shelf life of at least about 4 months and comprising particles consisting essentially of a copolymer consisting essentially of at least about 80 weight per cent vinyl chloride and another copolymerizable vinyl monomer, the particles being fused in about 90 to 120 seconds at a temperature of about 280° to 300° F., the composition being plasticized with an epoxidized natural oil in an amount of about 30 to 130 parts by weight per 100 parts by weight of copolymer.

2. An assembly as defined in claim 1 the copolymer is about 85 to 95 weight percent of vinyl chloride and vinyl acetate.

3. An assembly as defined in claim 1 in which an epoxy resin is used along with a crosslinking agent for the epoxy resin, to provide a liner that is curable at room temperature to provide a crosslinked liner.

4. A closure assembly as defined in claim 1 in which the oil is epoxidized soybean oil.

5. A closure assembly as defined in claim 1 in which the oil is epoxidized linseed oil.

6. A closure assembly as defined in claim 1 in which the oil is epoxidized tall oil.

7. A closure assembly as defined in claim 1 in which the particles are a copolymer of vinyl chloride and vinyl acetate.

8. A closure assembly as defined in claim 1 in which the plastisol corporation has 100 parts by weight of vinyl chloride copolymer and 100 parts by weight of epoxidized oil.

9. A closure assembly as defined in claim 1 in which the composition has 100 parts by weight per 80 parts by weight of epoxidized oil.

10. A closure assembly as defined in claim 1 in which the plastisol composition has a fusing temperature of about 288° F. and a fusing time of about 90 seconds.

11. A closure assembly comprising a closure having a top having an inside surface and a depending skirt adapted for engagement wiht a container finish, a solid non-foam thermoplastic plastisol composition annular ring gasket around the periphery of the inside surface of the top to form a seal with the closure and the container finish, the plastisol composition having a shelf life of at least about four months and comprising a copolymer plasticizer consisting essentially of a copolymer consisting essentially of vinyl chloride and another copolymerizable vinyl monomer, and an epoxidized vegetable oil plasticizer in an amount of about 30 to 130 parts by weight per 100 parts by weight of the copolymer, the combination of the copolymer and the epoxidized oil providing the shelf life of at least about four months and being effective to fuse the particles in the composition at about 280° F. to 300° F. to form the gasket and then to provide a stable gasket.

12. A closure assembly as defined in claim 11 in which the copolymer has bout 85 to 95 weight percent vinyl chloride and about 5 to 15 weight percent vinyl acetate.

13. A closure assembly as defined in claim 12 in which the copolymer has about 85 weight percent vinyl chloride and about 15 weight percent vinyl acetate.

14. A closure assembly as defined in claim 11 in which there is about 70 to 100 parts by weight of the epoxidized oil per 100 parts by weight of the copolymer.

15. A closure assembly as defined in claim 11 in which the copolymer is about 85 to 95 weight percent vinyl chloride and 5 to 15 weight percent vinyl acetate, there is about 70 to 100 parts by weight of the epoxidized oil per 100 parts by weight of the copolymer, the fusing time is about 90 to 120 sec, and the storage stability of the plastisol composition is at least about 8 months.

16. A closure assembly as defined in claim 11 in which the plastisol composition further includes an epoxy resin and a crosslinking agent for the epoxy resin to provide a solid plastisol liner that is curable at room temperature to provide a crosslinked liner.

* * * * *